United States Patent
Thompson et al.

(10) Patent No.: US 10,141,795 B2
(45) Date of Patent: Nov. 27, 2018

(54) METHOD FOR MITIGATING THERMAL AGING OF PERMANENT MAGNETS IN ORGANIC LIQUID

(71) Applicant: GM Global Technology Operations LLC, Detroit, MI (US)

(72) Inventors: Margarita P. Thompson, Livonia, MI (US); Frederick E. Pinkerton, Macomb Township, MI (US); Michael P. Balogh, Novi, MI (US); Gayatri Vyas Dadheech, Bloomfield Hills, MI (US); Xiaoqing Zeng, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 347 days.

(21) Appl. No.: 15/064,211

(22) Filed: Mar. 8, 2016

(65) Prior Publication Data

US 2016/0308405 A1    Oct. 20, 2016

Related U.S. Application Data

(60) Provisional application No. 62/150,102, filed on Apr. 20, 2015.

(51) Int. Cl.
*H02K 1/02* (2006.01)
*H01F 1/057* (2006.01)
*H01F 1/06* (2006.01)

(52) U.S. Cl.
CPC ............. *H02K 1/02* (2013.01); *H01F 1/0571* (2013.01); *H01F 1/061* (2013.01)

(58) Field of Classification Search
CPC .......... H02K 1/02; H01F 1/0571; H01F 1/061
USPC .................................. 310/43, 44, 45
See application file for complete search history.

(56) References Cited

U.S. PATENT DOCUMENTS

| | | | | |
|---|---|---|---|---|
| 5,451,306 A | * | 9/1995 | Nakamura | C09D 5/4457 204/503 |
| 5,658,660 A | * | 8/1997 | Teshima | H01F 3/00 310/45 |
| 6,027,626 A | * | 2/2000 | Kurosawa | C09D 5/4492 204/501 |
| 9,145,878 B1 | * | 9/2015 | McKenzie | F04B 35/045 |

(Continued)

FOREIGN PATENT DOCUMENTS

| CN | 1123966 A | 6/1996 |
|---|---|---|
| CN | 1175066 A | 3/1998 |

(Continued)

*Primary Examiner* — Forrest M Phillips
(74) *Attorney, Agent, or Firm* — Harness, Dickey & Pierce, P.L.C.

(57) ABSTRACT

An electric motor is provided for use in an electromechanical transmission that utilizes automatic transmission fluid. The electric motor includes a stator and a rotor. The rotor includes a plurality of permanent magnets can include magnetic particles coated with hydrogen impermeable material. According to an alternative embodiment, the entire permanent magnet or the rotor itself can be coated with hydrogen impermeable material. According to a further alternative embodiment, the permanent magnet particles can be secured by a binder that includes a hydrogen storage compound that prevents hydrogen from affecting magnetic properties of the permanent magnet.

20 Claims, 1 Drawing Sheet

(56) References Cited

U.S. PATENT DOCUMENTS

| | | | | |
|---|---|---|---|---|
| 2006/0097600 A1* | 5/2006 | Baumann | ............... | H02K 3/345 |
| | | | | 310/196 |
| 2007/0252462 A1* | 11/2007 | Holmes | ................. | H02K 7/085 |
| | | | | 310/112 |
| 2008/0124235 A1* | 5/2008 | Honkura | ................. | F04D 5/002 |
| | | | | 417/423.14 |
| 2012/0153759 A1* | 6/2012 | Kawashita | ............... | B22F 1/02 |
| | | | | 310/152 |
| 2014/0183984 A1* | 7/2014 | Kobayashi | ............... | H02K 5/08 |
| | | | | 310/43 |

FOREIGN PATENT DOCUMENTS

| | | | |
|---|---|---|---|
| CN | 101048832 A | 10/2007 | |
| CN | 102007549 A | 4/2011 | |
| CN | 103890880 A | 6/2014 | |
| JP | H09322448 A | 12/1997 | |
| WO | 2006059603 A1 | 6/2006 | |
| WO | 2013061836 A1 | 5/2013 | |

* cited by examiner

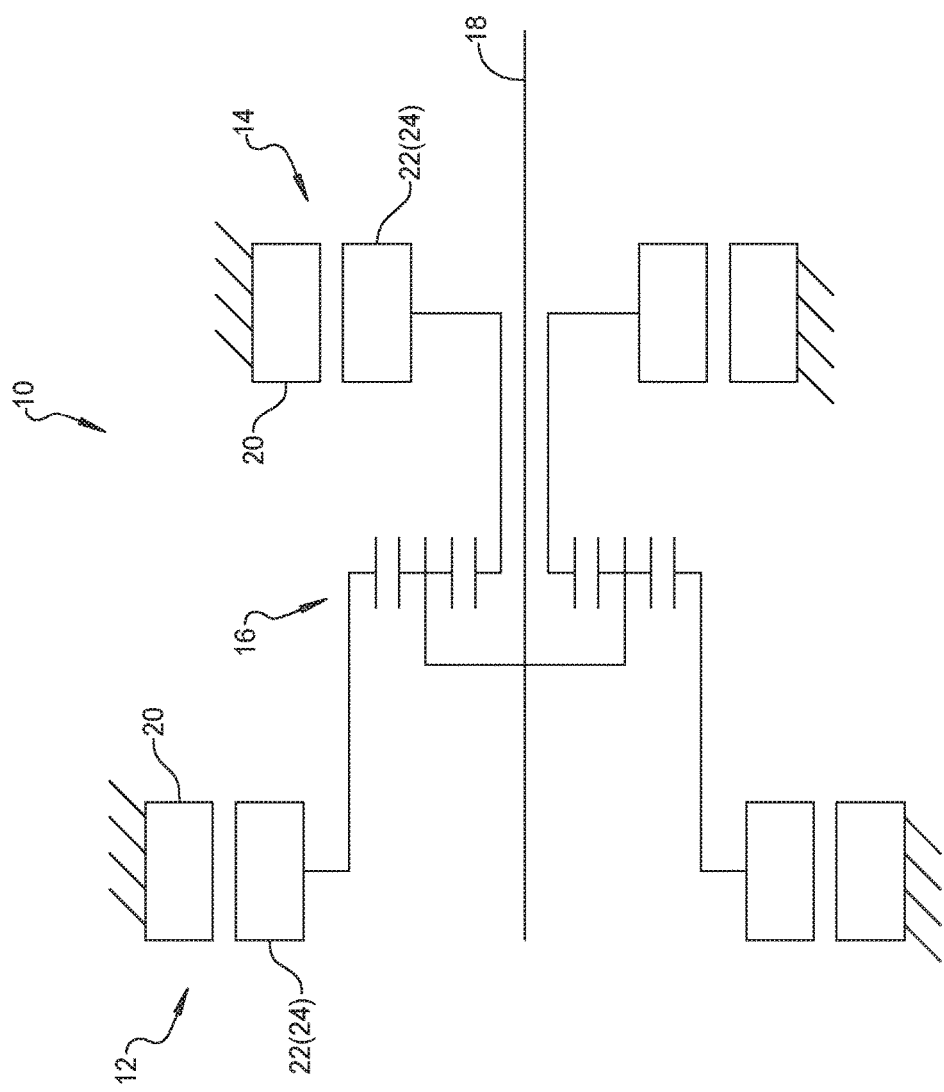

METHOD FOR MITIGATING THERMAL AGING OF PERMANENT MAGNETS IN ORGANIC LIQUID

CROSS-REFERENCE TO RELATED APPLICATIONS

This application claims the benefit of U.S. Provisional Application No. 62/150,102, filed on Apr. 20, 2015. The entire disclosure of the above application is incorporated herein by reference.

This invention was made with government support under Program No. GA21-GG8P.92—Injection Molded Magnets DPN awarded by the United States Department of Energy. The government has certain rights in the invention.

FIELD

The present disclosure relates to a method of mitigating thermal aging of permanent magnets in organic fluids.

BACKGROUND

This section provides background information related to the present disclosure which is not necessarily prior art.

Electric and hybrid vehicles utilize electric motors to provide drive torque to the vehicle wheels. Electric traction motors used as the main drive system for electrified vehicles in some instances are located inside the drive unit and are lubricated and cooled using automatic transmission fluid (ATF). During operation, the permanent magnets used in traction motors are exposed to ATF at relatively high operating temperatures; the motors can reach 150-160° C. during vehicle operation. Thermal aging studies conducted for times as long as 2000 hours have shown that compression molded and injection molded NdFeB magnets exposed to ATF aged more rapidly than the same magnets aged in air, and the degradation of permanent magnetic properties, especially the intrinsic coercivity, can be as large as 18%. Further study identified hydrogen released from the ATF and absorbed by the magnetic material as the most probable cause of the accelerated thermal aging of the magnetic material within the ATF. The present disclosure seeks to reduce or eliminate thermal aging of bonded magnets that are utilized in environments exposed to transmission fluid or similar organic liquids by protecting the magnetic powder from hydrogen exposure.

Currently, full density NdFeB magnets such as sintered magnets are often surface coated with a barrier intended to protect the magnet from corrosion due to oxygen, moisture or salts. In many cases, compression molded magnets are also surface coated for the same reason. The barrier material is not selected on the basis of its low permeability to hydrogen. The binder materials are also not selected to have low permeability to hydrogen.

SUMMARY

This section provides a general summary of the disclosure, and is not a comprehensive disclosure of its full scope or all of its features.

Providing a barrier coating reduces exposure of the injection or compression molded magnets to the thermal aging effects of hydrogen released from organic liquid such as automatic transmission fluid. It also provides protection against degradation due to other environmental aging agents, including direct exposure to ATF, air, oxygen, moisture, salts and other reactive or corroding agents.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The drawings described herein are for illustrative purposes only of selected embodiments and not all possible implementations, and are not intended to limit the scope of the present disclosure.

The FIGURE illustrates a schematic view of an exemplary electric motor/generator in an electromechanical transmission according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

With reference to the FIGURE, an exemplary electromagnetic transmission 10 is shown including a first electric motor 12 and a second electric motor 14 that operatively provide driving torque to a planetary gear system 16 for driving an output shaft 18. The first and second electric motor 12, 14 each include a stator 20 fixed within a housing 21 and a rotor 22 as is well-known in the art. As is generally known in the art, each rotor 22 includes a plurality of permanent magnets 24. It should be understood that the exemplary electromagnetic transmission 10 is shown for purposes of illustration and alternative forms of electromagnetic transmissions and electric motors can be utilized.

The present disclosure consists of methods of protecting compression molded and injection molded magnets 24 from the thermal aging effects of organic liquids such as automatic transmission fluid (ATF) that is utilized within the transmission 10. Compression molded and injection molded magnets generally include magnetic particles/powders that are suspended within a binder materials such as an engineering plastic. Magnets made using powders of rare earth magnet compositions, for example NdFeB ($Nd_2Fe_{14}B$) and SmCo ($SmCo_5$; $SM_2Co_{17}$) magnetic powder, are among the magnetic materials susceptible to degradation of magnetic properties in hydrogen.

In one embodiment, protection can be accomplished by coating individual powder particles with a hydrogen-impermeable film. Such film should be as thin as possible, so as to minimize the dilution of permanent magnet properties, while still affording sufficient protection to the powder particles by forming a pinhole-free coating that impedes hydrogen diffusion to acceptable levels. Coating materials may be metals or metal-containing compounds such as Cu, Ni, FeTi, NiTi, Al, $Al_2O_3$. AlSi, TiC, TiN, $TiO_2$, SiC, W, BN, Mo, Sn, Cr, $Cr_2O_3$, and other metal containing compounds that are known to have low diffusion coefficients to hydrogen. Metal coatings or metal-containing compounds may be applied by electroless plating, physical vapor deposition (PVD), chemical vapor deposition (CVD), plasma enhanced chemical vapor deposition (PECVD) and atomic layer deposition (ALD), etc.

Alternatively, dense high temperature polymers may also be used in sufficient thickness around each particle to impede hydrogen diffusion into the magnetic particle. Another alternative is using a graphitic carbon, graphene, reduced graphene oxide (RGO), etc. shell around the particles to inhibit hydrogen diffusion. In a preferred method the individual particles are coated by electroless Ni plating. In another preferred method the coating material is applied by chemical vapor deposition. Alternative coating techniques can include electrostatic coating and a silkscreen process. Electrostatic powder coating is a type of coating that is applied as a free-flowing, dry powder. The main difference between a conventional liquid paint and a powder coating is that the powder coating does not require a solvent to keep the binder and filler parts in a liquid suspension form. The coating is typically applied electrostatically and is then cured under heat to allow it to flow and form a "skin". The powder may be a thermoplastic or a thermoset polymer. It is usually used to create a hard finish that is tougher than conventional paint.

In another embodiment, the binder material for the injection molded or compression molded magnet may be selected from a list of high density, high temperature polymers that function as the injection compression molding carrier, temperature resistant binder, and barrier to hydrogen diffusion. Polymers that have low hydrogen permeability include: fluoropolymer (PVDF, PVF e.g., Kynar), polyethylene terephthalate (PET), parylene, Ethylene tetrafloroethylene (ETFE), Chlorortrifluoroethylene (CTFE), polypyrole, polyether etherketone (PEEK), polysulfone (PSF), high temperature polyamide, polyimide, and other materials having low hydrogen permeability.

In another embodiment the compression molded or injection molded magnet is formed according to previously known forming techniques. The finished magnet is then coated with an impermeable layer including metals and compounds such as Cu, Ni, FeTi, NiTi, Al, $Al_2O_3$. AlSi, TiC, TiN, $TiO_2$, SiC, W, BN, Mo, Sn, Cr, $Cr_2O_3$, Carbon, graphene, reduced graphene oxide etc. that are known to have low diffusion coefficients to hydrogen or polymers that have low hydrogen permeability including: fluoropolymer (PVDF, PVF, e.g. Kynar), polyethylene terephthalate (PET), parylene, chloro-trifluoroethylene, Ethylene tetrachloroethylene (ETFE), polypyrole, polyether etherketone (PEEK), polysulfone (PSF), high temperature polyamide, polyimide, and other materials having low hydrogen permeability.

In another embodiment, the barrier coating or film is applied into a mold or device cavity into which the magnet is to be injection or compression molded. It should be understood that the permanent magnet can be injection molded directly into the magnet cavity of a rotor of the electric motor. The magnet is then molded into the lined cavity inside the barrier layer. After molding a final barrier coating is applied to the exposed outer face of the magnet left from the molding process. The barrier coating or film may be non-conformable, i.e., tightly lining the mold or cavity prior to molding, or conformable, i.e. loosely placed into the cavity such that the subsequent molding pressure stretches the barrier material depressive against the mold or cavity walls. The barrier coating or film may be Cu, Ni, FeTi, NiTi, Al, $AL_2O_3$, AlSi, TiC, TiN, $TiO_2$, SiC, W, BN, Mo, Sn Cr, $Cr_2O_3$, Carbon, graphene, reduced graphene oxide (RGO) etc. that are known to have low diffusion coefficients to hydrogen or polymers that have low hydrogen permeability including: fluoropolymer (PVDF, PVF, e.g. Kynar), polyethylene terephthalate (PET), parylene, chlorortrifluoroethylene (CTFE), Ethylene tetrafluoroethylene (ETFE), polypyrole, polyether etherketone (PEEK), polysulfone (PSF), high temperature polyamide, polyimide, and other materials having low hydrogen permeability.

In another embodiment, a protective coating including metals and compounds such as Cu, Ni, FeTi, NiTi, Al, $Al_2O_3$. AlSi, TiC, TiN, $TiO_2$, SiC, W, BN, Mo, Sn, Cr, $Cr_2O_3$, carbon, graphene, reduced graphene oxide (RGO) etc. that are known to have low diffusion coefficients to hydrogen or polymers that have low hydrogen permeability including: fluoropolymer (PVDF, PVF, e.g. Kynar), polyethylene terephthalate (PET), parylene, Chlorotrifluoroethylene (CTFE), ethylene tetrachloroethylene (ETFE), polypyrole, polyether etherketone (PEEK), polysulfone (PSF), high temperature polyamide, polyimide, and other materials having low hydrogen permeability is applied to the entire device after the injection or compression molded magnets are molded into or inserted into the device. For example, the entire electric motor rotor can be coated in its entirety after completion of the rotor assembly.

In another embodiment, a second compound is included within the binder material of the compression or injection molded magnet that preferentially absorbs or reacts with hydrogen that penetrates the binder of the injection molded or compression molded permanent magnet. In this method the second compound captures the hydrogen by absorbing the hydrogen more readily than the permanent magnet powder or by sacrificially reacting with the hydrogen, thus removing the hydrogen before it interacts with the permanent magnet powder. For example, hydrogen storage compound such as $LaNi_5$ and $Mg_2Ni$ readily absorb hydrogen to form $LaNi_5H_6$ and $Mg_2NiH_4$.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Two or more embodiments may also be used together. Such variations are not to be regarded as a departure from the disclosure, and all such modifications are intended to be included within the scope of the disclosure.

What is claimed is:

1. An electric motor, comprising:
   a stator;
   a rotor including a plurality of magnets, said magnets having individual magnetic particles that are coated with a pinhole-free coating of hydrogen impermeable material sufficient to prevent hydrogen from permeating the hydrogen impermeable material to the magnetic particles.

2. The electric motor according to claim 1, wherein the hydrogen impermeable material includes a metal or metal containing compound.

3. The electric motor according to claim 2, wherein the metal or metal containing compound includes at least one of Cu, Ni, FeTi, NiTi, Al, $Al_2O_3$, AlSi, TiC, TiN, $TiO_2$, SiC, W, BN, Mo, Sn, Cr, $Cr_2O_3$.

4. The electric motor according to claim 1, wherein the hydrogen impermeable material includes a dense high temperature polymer.

5. The electric motor according to claim 4, wherein the dense high temperature polymer includes at least one of fluorpolymerpolyethylene terephthalate, parylene, ethylene tetrachloroethylene, chlorotrifluoroethylene, polypyrole, polyether etherketone, polysulfone, polyamide, and polyimide.

6. The electric motor according to claim 1, wherein the hydrogen impermeable material includes at least one of a graphitic carbon, graphene, reduced graphene oxide.

7. An electric motor, comprising:
   a stator;
   a rotor including a plurality of magnets, said magnets being individually coated with a pinhole-free coating of hydrogen impermeable material sufficient to prevent hydrogen from permeating the hydrogen impermeable material to the magnets.

8. The electric motor according to claim 7, wherein the hydrogen impermeable material includes a metal or metal containing compound.

9. The electric motor according to claim 8, wherein the metal or metal containing compound includes at least one of Cu, Ni, FeTi, NiTi, Al, $Al_2O_3$, AlSi, TiC, TiN, $TiO_2$, SiC, W, BN, Mo, Sn, Cr, $Cr_2O_3$.

10. The electric motor according to claim 7, wherein the hydrogen impermeable material includes a dense high temperature polymer.

11. The electric motor according to claim 10, wherein the dense high temperature polymer includes at least one of fluoropolymer, polyethylene terephthalate, parylene, ethylene tetrachloroethylene, chloro-trifluoroethylene, polypyrole, polyether etherketone, polysulfone, polyamide, and polyimide.

12. The electric motor according to claim 7, wherein the hydrogen impermeable material includes at least one of a graphitic carbon, graphene, reduced graphene oxide.

13. An electric motor, comprising:
    a stator;
    a rotor including a plurality of magnets, said rotor being coated with a pinhole-free coating of hydrogen impermeable material sufficient to prevent hydrogen from permeating the hydrogen impermeable material to the magnets.

14. The electric motor according to claim 13, wherein the hydrogen impermeable material includes a metal or metal containing compound.

15. The electric motor according to claim 14, wherein the metal or metal containing compound includes at least one of Cu, Ni, FeTi, NiTi, Al, $Al_2O_3$, AlSi, TiC, TiN, $TiO_2$, SiC, W, BN, Mo, Sn, Cr, $Cr_2O_3$.

16. The electric motor according to claim 13, wherein the hydrogen impermeable material includes a dense high temperature polymer.

17. The electric motor according to claim 16, wherein the dense high temperature polymer includes at least one of fluoropolymer, polyethylene terephthalate, parylene, ethylene tetrachloroethylene, chloro-trifluoroethylene, polypyrole, polyether etherketone, polysulfone, polyamide, and polyimide.

18. The electric motor according to claim 13, wherein the hydrogen impermeable material includes at least one of a graphitic carbon, graphene, reduced graphene oxide.

19. An electric motor, comprising:
    a stator;
    a rotor including a plurality of magnets, said magnets having magnetic particles held together with a binder material, wherein the binder material includes a hydrogen storage compound.

20. The electric motor according to claim 19, wherein the hydrogen storage compound includes one of $LaNi_5$ and $Mg_2Ni$.

* * * * *

UNITED STATES PATENT AND TRADEMARK OFFICE
CERTIFICATE OF CORRECTION

PATENT NO. : 10,141,795 B2
APPLICATION NO. : 15/064211
DATED : November 27, 2018
INVENTOR(S) : Margarita P. Thompson et al.

It is certified that error appears in the above-identified patent and that said Letters Patent is hereby corrected as shown below:

At Column 1, Line numbers 12-15, delete the entire paragraph, and insert the following paragraph therefor:
--This invention was made with government support under Contract No. DE-EE0002629 awarded by the United States Department of Energy. The government has certain rights in the invention.--

Signed and Sealed this
Tenth Day of September, 2019

Andrei Iancu
*Director of the United States Patent and Trademark Office*